(12) United States Patent
Moe et al.

(10) Patent No.: US 7,622,678 B2
(45) Date of Patent: Nov. 24, 2009

(54) COAXIAL CABLE INCLUDING TUBULAR BIMETALLIC OUTER LAYER WITH FOLDED EDGE PORTIONS AND ASSOCIATED METHODS

(75) Inventors: Alan N. Moe, Hickory, NC (US); Larry W. Nelson, Hickory, NC (US)

(73) Assignee: Commscope Inc. of North Carolina, Hickory, NC (US)

( * ) Notice: Subject to any disclaimer, the term of this patent is extended or adjusted under 35 U.S.C. 154(b) by 6 days.

(21) Appl. No.: 11/957,100

(22) Filed: Dec. 14, 2007

(65) Prior Publication Data

US 2009/0151974 A1    Jun. 18, 2009

(51) Int. Cl.
H01B 7/18    (2006.01)
(52) U.S. Cl. .................................... 174/102 R
(58) Field of Classification Search ............ 174/36, 174/102 R, 106 R
See application file for complete search history.

(56) References Cited

U.S. PATENT DOCUMENTS

| | | | |
|---|---|---|---|
| 2,199,150 A | 4/1940 | Chace | |
| 2,212,715 A * | 8/1940 | Levan | 29/505 |
| 2,759,990 A | 8/1956 | Bean | |
| 3,327,383 A | 6/1967 | Reed | |
| 3,360,409 A | 12/1967 | Jachimowicz et al. | |
| 3,405,228 A | 10/1968 | Polizzano | |
| 3,541,221 A | 11/1970 | Aupoix et al. | |
| 3,717,719 A | 2/1973 | Smith et al. | 174/107 |
| 3,766,645 A * | 10/1973 | Ziemek | 29/828 |
| 3,823,253 A | 7/1974 | Walter et al. | 174/69 |
| 4,250,351 A | 2/1981 | Bridges | 174/106 |
| 4,349,243 A | 9/1982 | Amano et al. | 350/96.23 |
| 4,567,321 A | 1/1986 | Harayama | 174/117 |
| 4,816,611 A | 3/1989 | Invernizzi | 174/2 |
| 5,298,682 A | 3/1994 | Salz | 174/105 |
| 5,500,488 A | 3/1996 | Buckel | 174/102 |
| 5,946,798 A | 9/1999 | Buluschek | 29/828 |
| 6,137,058 A | 10/2000 | Moe et al. | 174/102 |
| 6,201,189 B1 | 3/2001 | Carlson et al. | 174/102 |
| 6,246,008 B1 | 6/2001 | Fluckiger et al. | 174/126.1 |
| 6,342,677 B1 | 1/2002 | Lee | 174/106 |
| 6,417,454 B1 | 7/2002 | Biebuyck | 174/106 |
| 6,509,521 B1 | 1/2003 | Geitz | 174/28 |

(Continued)

FOREIGN PATENT DOCUMENTS

EP    0301859    2/1989

(Continued)

*Primary Examiner*—Chau N Nguyen
(74) *Attorney, Agent, or Firm*—Allen, Dyer, Doppelt, Milbrath & Gilchrist, P.A.

(57) ABSTRACT

A coaxial cable may include an inner conductor, an outer conductor, and a dielectric material therebetween. The outer conductor may include a tubular bimetallic layer having a pair of opposing longitudinal edge portions at a longitudinal seam. The tubular bimetallic layer may include an inner metal layer and an outer metal layer bonded thereto. At least one of the opposing longitudinal edge portions may define at least one folded edge portion including an end portion of the outer metal layer extending beyond a corresponding end portion of the inner metal layer and being folded adjacent thereto and defining a non-joined interface therewith. The longitudinal seam may include a welded joint between at least portions of the outer metal layer.

24 Claims, 4 Drawing Sheets

U.S. PATENT DOCUMENTS

| | | |
|---|---|---|
| 6,696,647 B2 | 2/2004 | Ono et al. .................. 174/102 |
| 6,697,647 B2 | 2/2004 | Higuchi et al. .............. 455/567 |
| 6,717,493 B2 | 4/2004 | Chopra et al. ............... 333/237 |
| 6,800,809 B2 | 10/2004 | Moe et al. .................. 174/102 |
| 6,831,231 B2 | 12/2004 | Perelman et al. ............ 174/102 |
| 6,953,888 B2 | 10/2005 | Livshitz et al. ................ 174/28 |
| 6,963,032 B2 | 11/2005 | Yamaguchi et al. ......... 174/102 |
| 7,034,228 B2 | 4/2006 | Yokoi et al. ................ 174/102 |
| 2003/0051897 A1 | 3/2003 | Blouin et al. ............... 174/106 |
| 2004/0089462 A1 | 5/2004 | Buckel ...................... 174/15.1 |
| 2004/0118591 A1 | 6/2004 | Bufanda et al. ............. 174/106 |
| 2005/0092513 A1 | 5/2005 | Brunker et al. ............. 174/102 |

FOREIGN PATENT DOCUMENTS

| | | |
|---|---|---|
| EP | 1469486 | 10/2004 |

\* cited by examiner

COAXIAL CABLE INCLUDING TUBULAR BIMETALLIC OUTER LAYER WITH FOLDED EDGE PORTIONS AND ASSOCIATED METHODS

FIELD OF THE INVENTION

The present invention relates to the field of communications, and, more particularly, to coaxial cables and associated methods for making the coaxial cables.

BACKGROUND OF THE INVENTION

Coaxial cables are widely used to carry high frequency electrical signals. Coaxial cables enjoy a relatively high bandwidth, low signal losses, are mechanically robust, and are relatively low cost. A coaxial cable typically includes an elongate inner conductor, a tubular outer conductor, and dielectric separating the inner and outer conductors. For example, the dielectric may be a plastic foam material. An outer insulating jacket may also be applied to surround the outer conductor.

One particularly advantageous use of coaxial cable is for connecting electronics at a cellular or wireless base station to an antenna mounted at the top of a nearby antenna tower. For example, the transmitter and receiver located in an equipment shelter may be coupled via coaxial cables to antennas carried by the antenna tower. A typical installation includes a relatively large diameter main coaxial cable extending between the equipment shelter and the top of the antenna tower to thereby reduce signal losses. For example, CommScope, Inc. of Hickory, N.C. offers its CellReach® coaxial cable for such applications.

In larger diameter coaxial cables, which are commonly used in cellular communication as described above, the elongate inner conductor can be tubular in shape. The tubular inner conductor may also surround an inner dielectric material. The inner conductor is typically manufactured by forming a flat layer or sheet of conductive material into a tube with a longitudinal seam and welding the seam to form a continuous joint. The outer conductor is also similarly manufactured by forming a flat layer or metal sheet into a tube with a longitudinal seam that is welded to form a continuous joint.

The high frequency signals carried by the coaxial cable are concentrated in only a small portion, radially outermost, of the inner conductor, and a correspondingly small radially innermost portion of the outer conductor. This characteristic is attributed to the electromagnetic phenomenon called the skin effect. Therefore, only the thin outer radial portion of the tubular inner conductor carries the high frequency transmission. Conversely, the outer tubular conductor also carries the high frequency signals in the thin radially innermost portion.

Bimetallic layers have been used for the inner and/or outer tubular conductors in a coaxial cable where a higher conductivity and more expensive metal is used to provide the radially outermost portion of an inner conductor, and is used to provide the radially innermost portion of the outer conductor. For example, the outermost layer of the inner conductor may include a relatively costly and highly conductive metal such as copper, and the inner layer of the inner conductor may include a less costly and less conductive metal, such as aluminum. For example, U.S. Pat. No. 6,717,493 B2 to Chopra et al. and U.S. Patent Application No. 2004/0118591 A1 to Bufanda et al. each discloses a coaxial cable with such bimetallic tubular inner conductors.

Notwithstanding the benefits of a bimetal tubular inner conductor, there may be some shortcomings. For example, the manufacture of a bimetal tubular inner conductor usually involves some form of heat based welding, such as for example, conventional induction welding, to weld the seam to form a welded joint. Unfortunately, the two metals that form the bimetal tubular inner conductor usually have different melting temperatures. For example, copper and aluminum are commonly used as the outer and inner layers of the inner conductor, respectively. Copper has a melting point of 1100° C. and a conductivity of $59.6 \times 10^6 \text{S} \cdot \text{m}^{-1}$, while aluminum has a lower melting point of 660° C. and a lower conductivity of $37.8 \times 10^6 \text{S} \cdot \text{m}^{-1}$. This disparity in melting points makes welding of the joint relatively difficult.

In response to this particular shortcoming in manufacture of bimetal tubular inner conductors, coaxial cable manufacturers have developed a coaxial cable with a bimetal tubular inner conductor comprising an inlaid bimetallic layer, such as disclosed, for example, in U.S. Pat. No. 6,342,677 to Lee. This coaxial cable is more easily welded since only the inner metal layer is welded during manufacture of the bimetal tubular inner conductor. Nonetheless, the inlaid bimetal inner conductor is relatively costly to manufacture. Of course, similar considerations apply to the outer conductor of a coaxial cable. That is a conventional bimetallic layer may be difficult to weld, and an inlaid bimetallic layer may be relatively expensive.

SUMMARY OF THE INVENTION

In view of the foregoing background, it is therefore an object of the present invention to provide a coaxial cable including an outer conductor fabricated using a less expensive tubular bimetallic layer that is also readily welded at its longitudinal seam.

This and other objects, features, and advantages in accordance with the present invention are provided by a coaxial cable that may comprise an outer conductor comprising a tubular bimetallic layer having a pair of opposing longitudinal edge portions at a longitudinal seam. The tubular bimetallic layer may include an inner metal layer and an outer metal layer bonded thereto. At least one of the opposing longitudinal edge portions may define at least one folded edge portion comprising an end portion of the outer metal layer extending beyond a corresponding end portion of the inner metal layer and being folded adjacent thereto and defining a non-joined interface therewith. In some embodiments, the folded end portion may be folded at a right angle adjacent the corresponding end portion of the inner metal layer. In other embodiments, the folded end portion may comprise an end portion of the outer metal layer extending beyond a corresponding end portion of the inner metal layer and being folded over onto itself adjacent the corresponding end portion of the inner metal layer and defining a non-joined interface therewith. In addition, the longitudinal seam may comprise a welded joint between at least portions of the outer metal layer. Accordingly, a less expensive starting material may be used for the outer conductor, that is, a simple bimetallic strip, as compared to the more expensive inlaid bimetallic strip, for example.

The at least one folded edge portion may comprise both of the opposing longitudinal edge portions, for example. The outer metal layer may have a lower melting temperature than the inner metal layer. The inner metal layer may also have a higher electrical conductivity than the outer metal layer. For example, the outer metal layer may comprise aluminum, and the inner metal layer may comprise copper.

The tubular bimetallic layer may have a thickness in a range of about 0.005 to 0.050 inches. The inner metal layer may have a percentage thickness relative to an overall thickness of the tubular bimetallic layer in a range of about 1 to 30%. The coaxial cable may also comprise another dielectric material layer filling the inner conductor. In addition, the cable may further comprise an insulating jacket surrounding the outer conductor.

A method aspect is for making a coaxial cable comprising an inner conductor, an outer conductor and a dielectric material layer between the inner and outer conductors. The method may comprise forming the inner conductor, forming a dielectric material layer surrounding the inner conductor, and forming the outer conductor. More particularly, forming the outer conductor may include forming a bimetallic strip into a tubular bimetallic layer having a pair of longitudinal edge portions and comprising an inner metal layer and an outer metal layer bonded thereto, with at least one of the longitudinal edge portions defining a folded edge portion comprising an end portion of the outer metal layer extending beyond a corresponding end portion of the inner metal layer being folded adjacent thereto and defining a non-joined interface therewith. The method may further include welding at least portions of the longitudinal seam to form a welded joint between at least portions of the outer metal layer.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
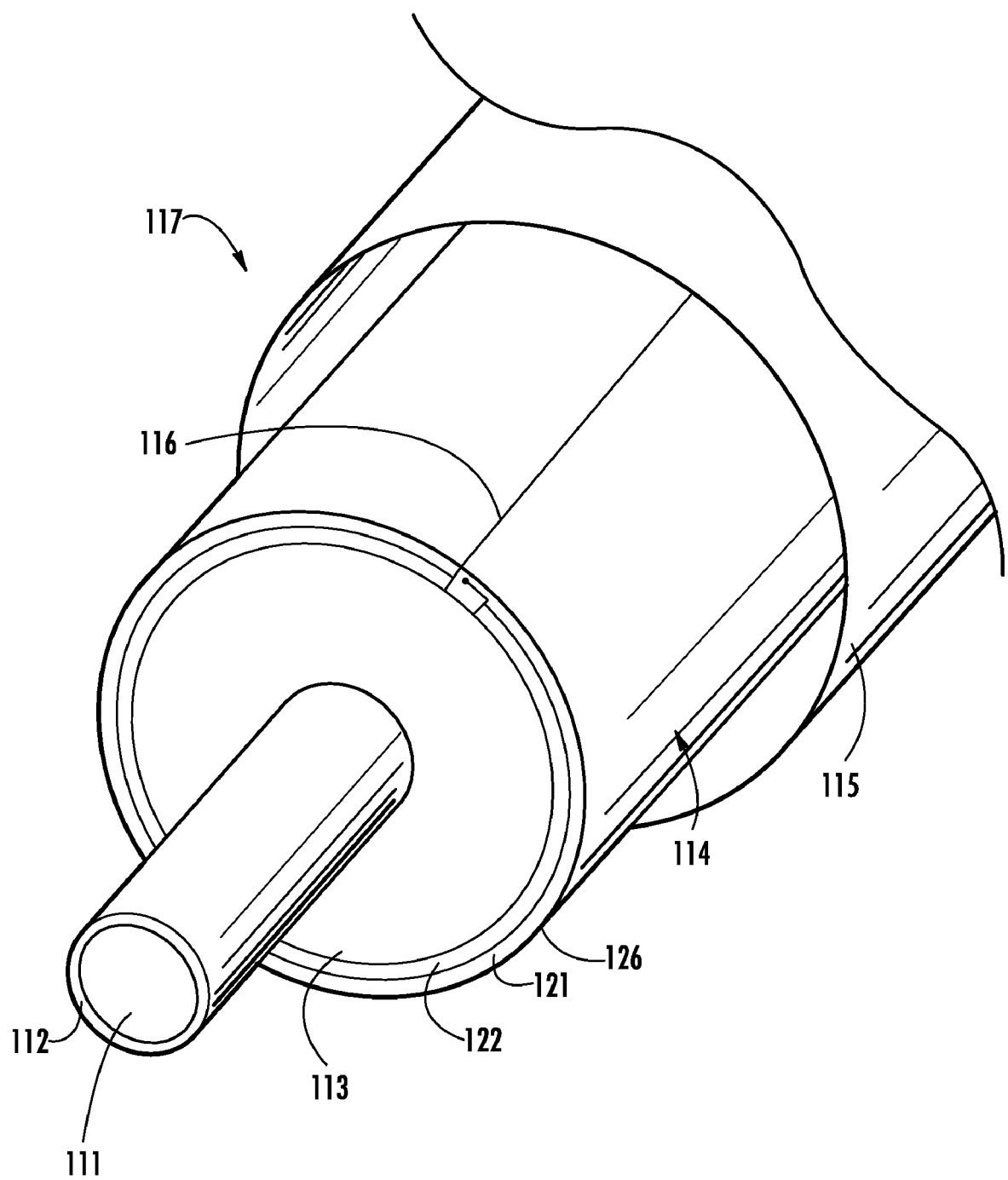
FIG. 1 is a perspective end view of a coaxial cable in accordance with the present invention.
Figure 2:
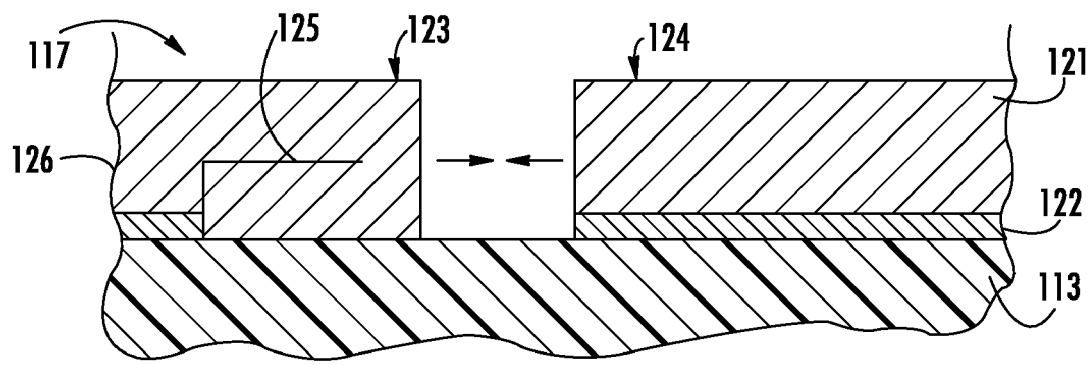
FIG. 2 is an enlarged cross-sectional view of a portion of the tubular bimetallic outer conductor of the coaxial cable of FIG. 1 shown prior to welding.

Referring now initially to FIGS. 1-2, a coaxial cable 117 in accordance with the present invention is described. The coaxial cable 117 illustratively includes an inner conductor 112, an outer conductor 114, and a dielectric material layer 113 between the inner and outer conductors. The outer conductor 114 illustratively includes a tubular bimetallic layer 126 having a pair of opposing longitudinal edge portions at a longitudinal seam 116. The tubular bimetallic layer 126 illustratively includes an inner metal layer 122 and an outer metal layer 121 bonded thereto.

The tubular bimetallic layer 126 illustratively includes one of the opposing longitudinal edge portions comprising an end portion 123 of the outer metal layer 121 extending outwardly beyond the inner metal layer 122 and being folded over onto itself adjacent the inner metal layer and defining a non-joined interface 125 therewith.

Moreover, the inner metal layer 122 may have a higher electrical conductivity than the outer metal layer 121 to facilitate signal carrying ability at the skin depth, for example. The outer metal layer 121 may have a lower melting temperature and lower cost than the inner metal layer 122 to facilitate welding, for example. The outer metal layer 121 may comprise aluminum or any suitable metal as appreciated by a person skilled in the art, and the inner metal layer 122 may comprise copper or any suitable metal as appreciated by those skilled in the art.

The tubular bimetallic layer 126 may have a thickness in a range of about 0.005 to 0.050 inches, and the inner metal layer 122 may have a percentage thickness relative to an overall thickness of the tubular bimetallic layer 126 in a range of about 1 to 30%.

Figure 3:
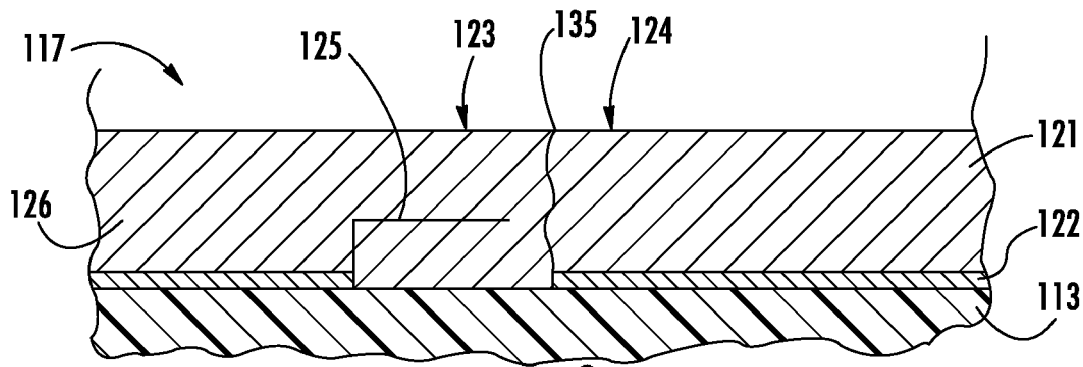
FIG. 3 is an enlarged cross-sectional view of the portion of the tubular bimetallic outer conductor of the coaxial cable of FIG. 1 shown after welding.

As shown perhaps best in FIG. 3, the longitudinal seam 116 illustratively includes a welded joint 135 between at least portions of the outer metal layer 121. The coaxial cable 117 illustratively includes another dielectric material layer 111 filling the inner conductor 112 and an insulating jacket 115 surrounding the outer conductor 25, comprising the tubular bimetallic layer 126. Of course, welding may cause at least some portion of the non-joined interface 125 to become joined as will be appreciated by those skilled in the art.

Figure 4:
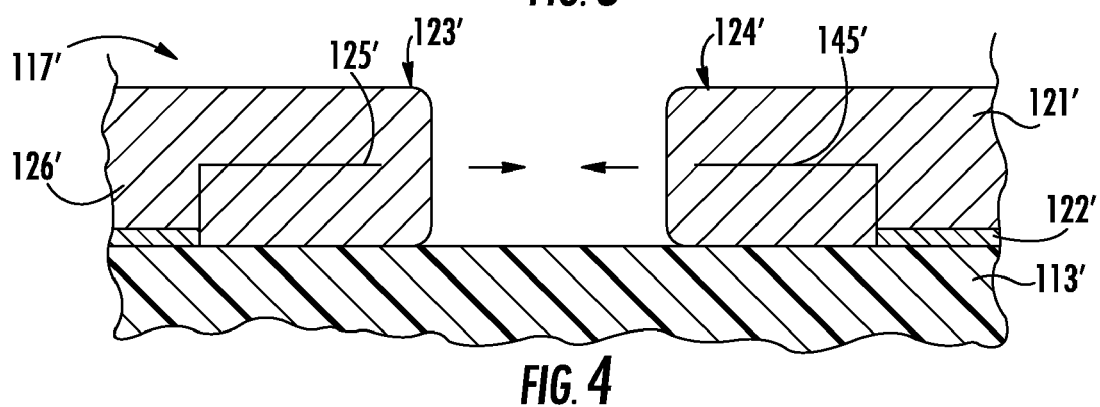
FIG. 4 is an enlarged cross-sectional view of a portion of a tubular bimetallic outer conductor of a coaxial cable of another embodiment shown prior to welding.
Figure 5:
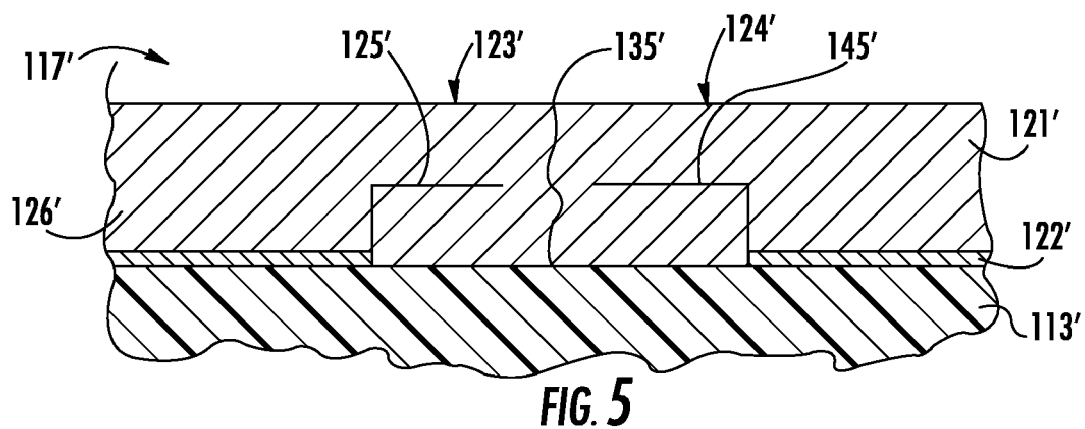
FIG. 5 is an enlarged cross-sectional view of the portion of the tubular bimetallic outer conductor of FIG. 4 shown after welding.

Referring now additionally to FIGS. 4-5, another embodiment is now described. In this embodiment of the coaxial cable 117', those elements already discussed above with respect to FIGS. 1-3 are given prime notation and most require no further discussion herein. This embodiment differs from the previous embodiment in that each of the opposing longitudinal edge portions illustratively includes end portions 123', 124' of the outer metal layer 121' extending outwardly beyond the inner metal layer 122' and being folded over onto themselves adjacent the inner metal layer and defining non-joined interfaces 125', 145' therewith. Of course, welding may cause at least some portions of the non-joined interfaces 125', 145' to become joined as will be appreciated by those skilled in the art.

Figure 6:
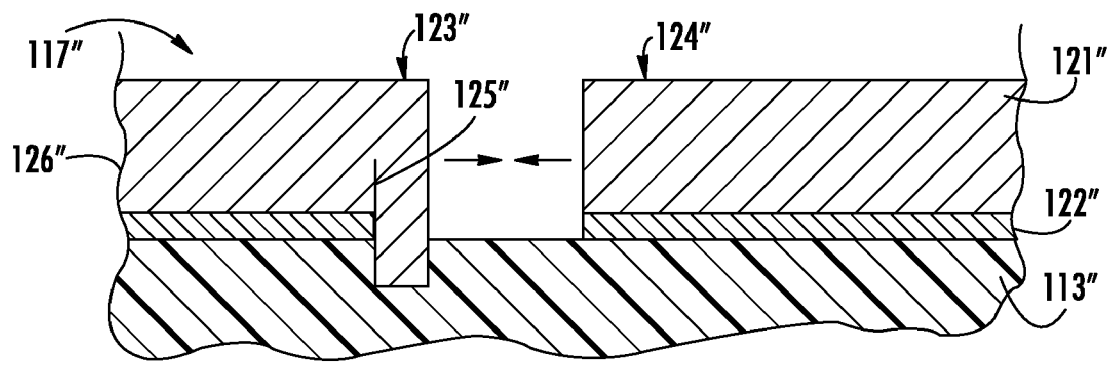
FIG. 6 is an enlarged cross-sectional view of a portion of a tubular bimetallic outer conductor of a coaxial cable of another embodiment shown prior to welding.
Figure 7:
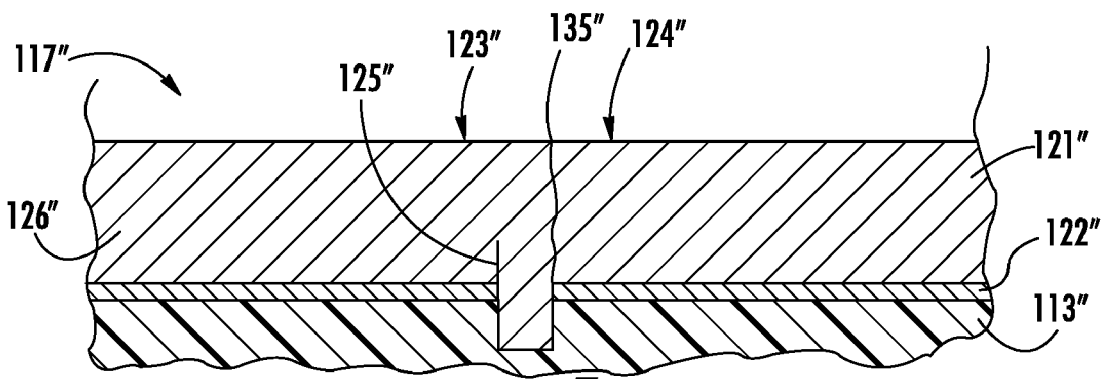
FIG. 7 is an enlarged cross-sectional view of the portion of the tubular bimetallic outer conductor of FIG. 6 shown after welding.

Referring now additionally to FIGS. 6-7, another embodiment is now described. In this embodiment of the coaxial cable 117", those elements already discussed above with respect to FIGS. 1-3 are given double prime notation and most require no further discussion herein. This embodiment differs from the previous embodiment in that the opposing longitudinal edge portions illustratively includes at least one end portion 123" of the outer metal layer 121" extending outwardly beyond the inner metal layer 122" and being folded at a right angle adjacent the inner metal layer and defining a non-joined interface 125" therewith. After welding, as shown perhaps best in FIG. 7, a welded joint 135" is formed between the adjacent portions of the inner metal layer 121".

Figure 8:
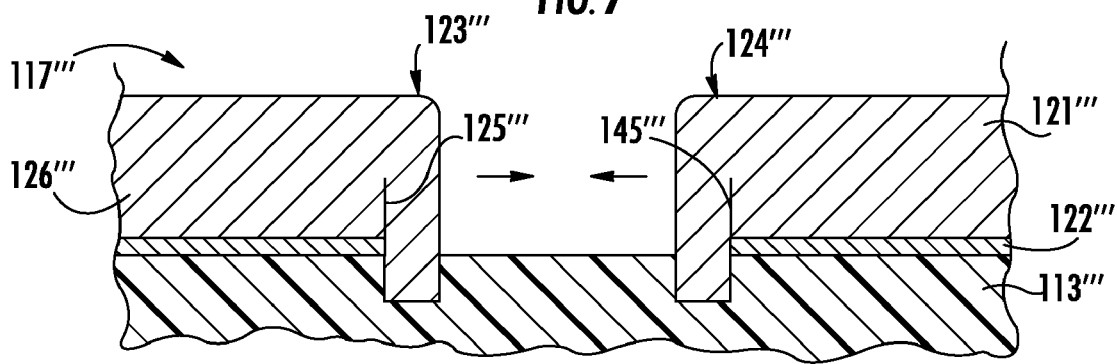
FIG. 8 is an enlarged cross-sectional view of a portion of a tubular bimetallic outer conductor of a coaxial cable of yet another embodiment shown prior to welding.
Figure 9:
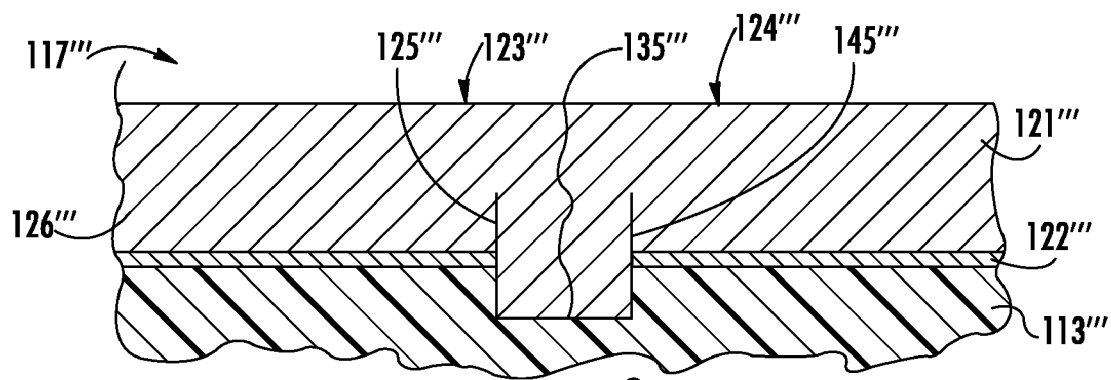
FIG. 9 is an enlarged cross-sectional view of the portion of the tubular bimetallic outer conductor of FIG. 8 shown after welding.

Referring now additionally to FIGS. 8-9, another embodiment is now described. In this embodiment of the coaxial cable 117''', those elements already discussed above with respect to FIGS. 6-7 are given triple prime notation and most require no further discussion herein. This embodiment differs from the previous embodiment in that each of the opposing longitudinal edge portions illustratively includes an end portion 123''', 124''' of the outer metal layer 121''' extending outwardly beyond the inner metal layer 122''' and being folded at a right angle adjacent the inner metal layer and defining a non-joined interface 125''', 145''' therewith.

Figure 10:
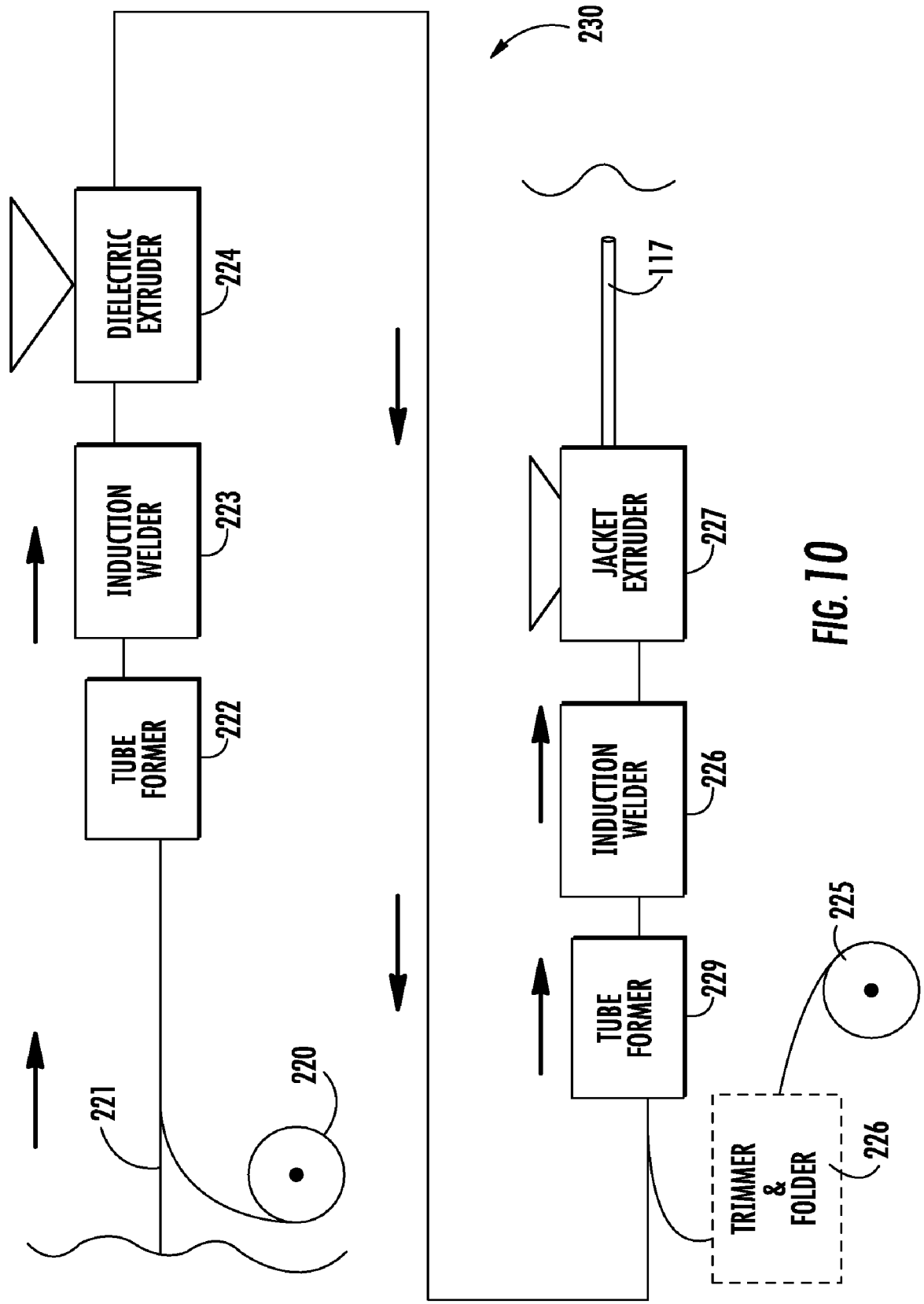
FIG. 10 is a schematic diagram of an apparatus for making a coaxial cable in accordance with the present invention.

Referring now additionally to FIG. 10, another aspect relates to a method and apparatus 230 for making a coaxial cable 117 that illustratively includes an inner conductor 122, an outer conductor 114 comprising tubular bimetallic layer 126, and a dielectric material layer 113 between the inner and outer conductors. A dielectric material rod 221 and supply reel 220 of metallic strip are fed into the tube former 222, which illustratively forms the inner conductor surrounding the dielectric material rod 221.

As will be appreciated by one skilled in the art, the dielectric material may be disposed inside the inner tube downstream from the tube former 222, or thereafter using settable material as described in U.S. Pat. No. 6,915,564.

The output of the tube former 222 is fed into the induction welder 223, which illustratively welds the inner conductor. The output of the induction welder 223 is fed into the dielectric extruder 224, which forms the dielectric material layer surrounding the inner conductor. The output of the dielectric extruder 224 is fed into the second tube former 229 along with a supply reel 225 of bimetallic strip with a pair of longitudinal edge portions.

The bimetallic strip illustratively includes an inner metal layer and an outer metal layer bonded thereto. The supply reel 225 of bimetallic strip may be provided with at least one of the longitudinal edge portions with an end portion of the outer metal layer extending outwardly beyond the inner metal layer. Further, the supply reel 225 of bimetallic strip may be provided comprising the end portion folded over onto itself adjacent the inner metal layer and defining a non-joined interface therewith.

In the alternative, the supply reel 225 of bimetallic strip may be fed into a trimmer/folder 226, shown with dashed lines, which illustratively trims at least one of the longitudinal edge portions to provide an end portion of the outer metal layer extending outwardly beyond the inner metal layer. The trimmer/folder 226 may trim the metal layer using a diamond or other blade, or any other trimming techniques as will be appreciated by those skilled in the art. Further, the trimmer/folder 226 illustratively folds the end portion over onto itself adjacent the inner metal layer and defining a non-joined interface therewith.

Further and as discussed above, the inner metal layer may have a higher electrical conductivity than the outer metal layer. The outer metal layer may have a lower melting temperature than the inner metal layer. The outer metal layer may comprise aluminum or any suitable metal as appreciated by a person skilled in the j art, and the inner metal layer may comprise copper or any suitable metal as appreciated by a person skilled in the art. The tubular bimetallic layer may have a thickness in a range of about 0.005 to 0.050 inches, and the inner metal layer may have a percentage thickness relative to an overall thickness of the tubular bimetallic layer in a range of about 1 to 30%.

The second tube former 229 illustratively forms the bimetallic strip into a tubular bimetallic layer having a pair of opposing longitudinal edge portions at a longitudinal seam to provide the outer conductor surrounding the dielectric material layer. The output of the second tube former 229 is fed into the second induction welder 226, which illustratively welds the longitudinal seam to form a welded joint between at least portions of the outer metal layer. The output of the second induction welder 226 is fed into the jacket extruder 227, which illustratively forms an insulating jacket surrounding the outer conductor. The completed coaxial cable 117 is output from the jacket extruder 227 for take-up on a suitable take-up reel, not shown.

In other embodiments, the supply reel 225 of bimetallic strip may be provided with at least one of the longitudinal edge portions with an end portion of the outer metal layer extending outwardly beyond the inner metal layer. Further, the supply reel 225 of bimetallic strip may be provided comprising the end portion folded at a right angle adjacent the inner metal layer and defining a non-joined interface therewith.

This application is related to copending patent applications entitled, COAXIAL CABLE INCLUDING TUBULAR BIMETALLIC INNER LAYER WITH BEVELLED EDGE JOINT AND ASSOCIATED METHODS, U.S. patent application Ser. No. 11/957,020; COAXIAL CABLE INCLUDING TUBULAR BIMETALLIC INNER LAYER WITH ANGLED EDGES AND ASSOCIATED METHODS, U.S. patent application Ser. No. 11/957,042; COAXIAL CABLE INCLUDING TUBULAR BIMETALLIC INNER LAYER WITH FOLDED EDGE PORTIONS AND ASSOCIATED METHODS, U.S. patent application Ser. No. 11/957,063; COAXIAL CABLE INCLUDING TUBULAR BIMETALLIC OUTER LAYER WITH BEVELLED EDGE JOINT AND ASSOCIATED METHODS, U.S. patent application Ser. No. 11/957,070; and COAXIAL CABLE INCLUDING TUBULAR BIMETALLIC OUTER LAYER WITH ANGLED EDGES AND ASSOCIATED METHODS, U.S. patent application Ser. No. 11/957,039 which are filed on the same date and by the same assignee and inventors, the disclosures of which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A coaxial cable comprising:
   an inner conductor, an outer conductor and a dielectric material layer between said inner and outer conductors;
   said outer conductor comprising a tubular bimetallic layer having a pair of opposing longitudinal edge portions at a longitudinal seam;
   said tubular bimetallic layer comprising an inner metal layer and an outer metal layer bonded thereto;
   at least one of the opposing longitudinal edge portions defining at least one folded edge portion comprising an end portion of said outer metal layer extending beyond a corresponding end portion of said inner metal layer and being folded adjacent thereto and defining a non-joined interface therewith;
   the longitudinal seam comprising a welded joint between at least portions of said outer metal layer.

2. A coaxial cable according to claim 1 wherein the at least one folded edge portion is folded at a right angle adjacent the corresponding end portion of said inner metal layer.

3. A coaxial cable according to claim 1 wherein the at least one folded edge portion is folded over onto itself adjacent the corresponding end portion of said inner metal layer.

4. A coaxial cable according to claim 1 wherein the at least one folded edge portion comprises both of the opposing longitudinal edge portions.

5. A coaxial cable according to claim 1 wherein said inner metal layer has a higher electrical conductivity than said outer metal layer.

6. A coaxial cable according to claim 1 wherein said outer metal layer has a lower melting temperature than said inner metal layer.

7. A coaxial cable according to claim 1 wherein said outer metal layer comprises aluminum; and wherein said inner metal layer comprises copper.

8. A coaxial cable according to claim 1 wherein said tubular bimetallic layer has a thickness in a range of about 0.005 to 0.050 inches.

9. A coaxial cable according to claim 1 wherein said inner metal layer has a percentage thickness relative to an overall thickness of said tubular bimetallic layer in a range of about 1 to 30%.

10. A coaxial cable according to claim 1 further comprising another dielectric material layer filling said inner conductor.

11. A coaxial cable according to claim 1 further comprising an insulating jacket surrounding said outer conductor.

12. A coaxial cable comprising:
an inner conductor, an outer conductor and a dielectric material layer between said inner and outer conductors;
said outer conductor comprising a tubular bimetallic layer having a pair of opposing longitudinal edge portions at a longitudinal seam;
said tubular bimetallic layer comprising an inner metal layer and an outer metal layer bonded thereto, said inner metal layer having a higher electrical conductivity than said outer metal layer, and said outer metal layer having a lower melting temperature than said inner metal layer;
at least one of the opposing longitudinal edge portions defining at least one folded edge portion comprising an end portion of said outer metal layer extending beyond a corresponding end portion of said inner metal layer and being folded over onto itself adjacent the corresponding end portion of said inner metal layer and defining a non-joined interface therewith;
the longitudinal seam comprising a welded joint between at least portions of said outer metal layer.

13. A coaxial cable according to claim 12 wherein the at least one folded edge portion comprises both of the opposing longitudinal edge portions.

14. A coaxial cable according to claim 12 wherein said outer metal layer comprises aluminum.

15. A coaxial cable according to claim 12 wherein said inner metal layer comprises copper.

16. A coaxial cable according to claim 12 wherein said tubular bimetallic layer has a thickness in a range of about 0.005 to 0.050 inches.

17. A coaxial cable according to claim 12 wherein said inner metal layer has a percentage thickness relative to an overall thickness of said tubular bimetallic layer in a range of about 1 to 30%.

18. A coaxial cable according to claim 12 further comprising another dielectric material layer filling said inner conductor layer; and an insulating jacket surrounding said outer conductor.

19. A method for making a coaxial cable comprising an inner conductor, an outer conductor and a dielectric material layer between the inner and outer conductors, the method comprising:
forming the inner conductor;
forming the dielectric material layer surrounding the inner conductor; and
forming the outer conductor by at least
forming a bimetallic strip into a tubular bimetallic layer having a pair of longitudinal edge portions and comprising an inner metal layer and an outer metal layer bonded thereto, at least one of the longitudinal edge portions defining at least one folded edge portion comprising an end portion of the outer metal layer extending beyond a corresponding end portion of the inner metal layer being folded adjacent thereto and defining a non-joined interface therewith, and
welding at least portions of the longitudinal seam to form a welded joint between at least portions of the outer metal layer.

20. A method according to claim 19 wherein the inner metal layer has a greater electrical conductivity than the outer metal layer, and the outer metal layer has a lower melting temperature than the inner metal layer.

21. A method according to claim 19 wherein the outer metal layer comprises aluminum; and wherein the inner metal layer comprises copper.

22. A method for making a coaxial cable comprising an inner conductor, an outer conductor and a dielectric material layer between the inner and outer conductors, the method comprising:
forming the inner conductor;
forming the dielectric material layer surrounding the inner conductor; and
forming the outer conductor by at least
forming a bimetallic strip into a tubular bimetallic layer having a pair of longitudinal edge portions and comprising an inner metal layer and an outer metal layer bonded thereto, at least one of the longitudinal edge portions defining at least one folded edge portion comprising an end portion of the outer metal layer extending beyond a corresponding end portion of the inner metal layer and being folded over onto itself adjacent the corresponding end portion of the inner metal layer and defining a non-joined interface therewith, and
welding at least portions of the longitudinal seam to form a welded joint between at least portions of the outer metal layer.

23. A method according to claim 22 wherein the inner metal layer has a greater electrical conductivity than the outer metal layer, and the outer metal layer has a lower melting temperature than the inner metal layer.

24. A method according to claim 22 wherein the outer metal layer comprises aluminum; and wherein the inner metal layer comprises copper.

* * * * *

UNITED STATES PATENT AND TRADEMARK OFFICE
CERTIFICATE OF CORRECTION

PATENT NO. : 7,622,678 B2  Page 1 of 1
APPLICATION NO. : 11/957100
DATED : November 24, 2009
INVENTOR(S) : Moe et al.

It is certified that error appears in the above-identified patent and that said Letters Patent is hereby corrected as shown below:

| | |
|---|---|
| Column 5, Line 18 | Delete: "comprising tubular"<br>Insert: --comprising a tubular-- |
| Column 5, Line 61 | Delete: "j" |
| Column 6, Line 39 | Delete: "11/957,039"<br>Insert: --11/957,089-- |

Signed and Sealed this

Seventh Day of September, 2010

David J. Kappos
*Director of the United States Patent and Trademark Office*